United States Patent
Kurtz et al.

(10) Patent No.: US 6,593,209 B2
(45) Date of Patent: *Jul. 15, 2003

(54) CLOSING OF MICROPIPES IN SILICON CARBIDE (SIC) USING OXIDIZED POLYSILICON TECHNIQUES

(75) Inventors: Anthony D. Kurtz, Ridgewood, NJ (US); Alexander A. Ned, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/002,260

(22) Filed: Nov. 15, 2001

(65) Prior Publication Data

US 2003/0092242 A1 May 15, 2003

(51) Int. Cl.[7] ................................. H01L 21/76
(52) U.S. Cl. ....................................... 438/431
(58) Field of Search ........................... 438/431

(56) References Cited

U.S. PATENT DOCUMENTS

| | | | | | |
|---|---|---|---|---|---|
| 4,994,141 | A | * | 2/1991 | Harms et al. | 156/643 |
| 5,076,147 | A | * | 12/1991 | Hegner et al. | 92/103 |
| 5,165,283 | A | * | 11/1992 | Kurtz et al. | 73/727 |
| 6,034,001 | A | | 3/2000 | Shor et al. | 438/931 |
| 6,058,782 | A | | 5/2000 | Kurtz et al. | 73/727 |
| 6,327,911 | B1 | * | 12/2001 | Kurtz et al. | 73/727 |

* cited by examiner

Primary Examiner—Hoai Ho
Assistant Examiner—Thao Le
(74) Attorney, Agent, or Firm—Duane Morris, LLP

(57) ABSTRACT

In order to close or cover micropipes, which generally are formed in SiC bulk material, one sputters or deposits or grows a layer of silicon on the backside of a micromachined silicon carbide diaphragm. This is followed by an oxidation process. In this approach, the deposition of silicon reduces or completely plugs the micropipes. After the silicon deposition, the wafer is oxidized which completely closes the otherwise reduced micropipes. Since the oxidation process is significantly faster than silicon and SiC, it is significantly easier to close even the largest of micropipes. The thickness of the silicon, the processing for depositing or growing silicon, and the process of oxidation can be adjusted to close micropipes in different SiC materials.

12 Claims, 3 Drawing Sheets

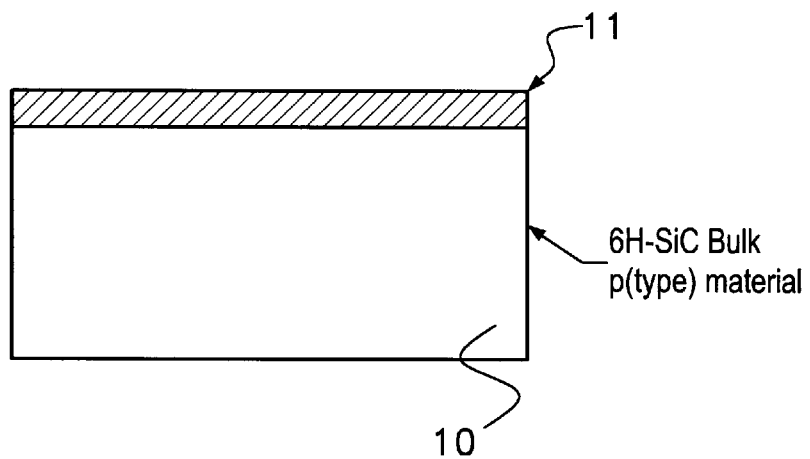
Fig. 1A (Prior Art)
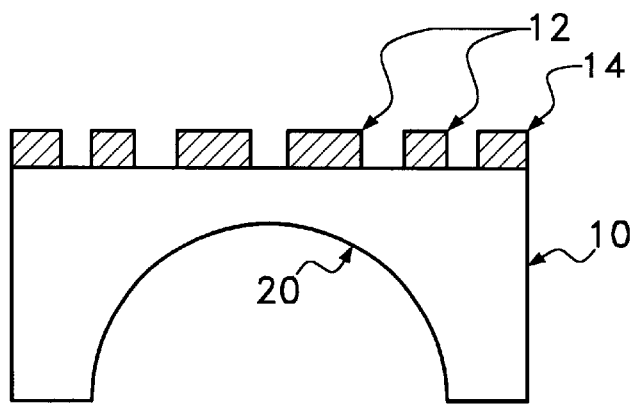
Fig. 1B (Prior Art)
Fig. 1

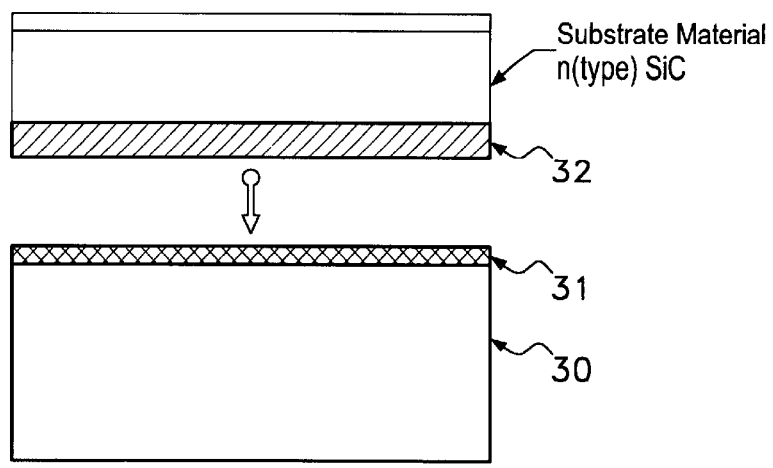
Fig. 2A (Prior Art)
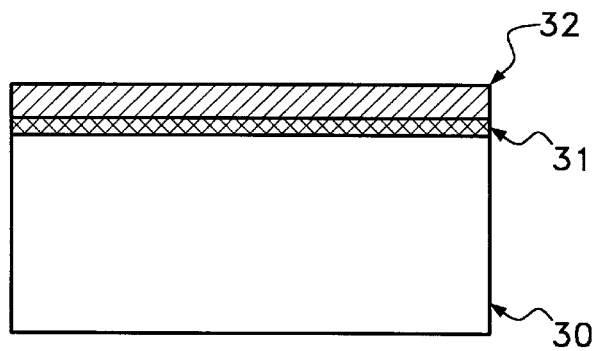
Fig. 2B (Prior Art)
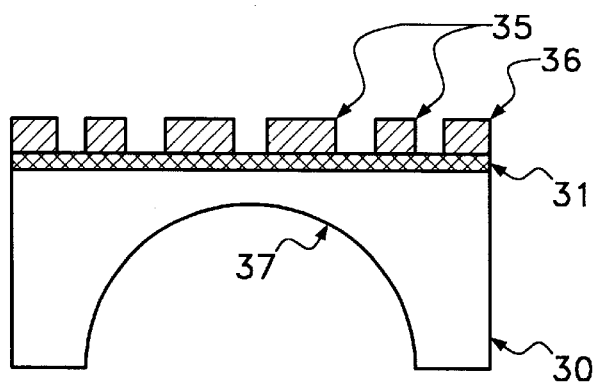
Fig. 2C (Prior Art)
Fig. 2

US 6,593,209 B2

CLOSING OF MICROPIPES IN SILICON CARBIDE (SIC) USING OXIDIZED POLYSILICON TECHNIQUES

FIELD OF INVENTION

This invention relates to semiconductor materials and in particularly to silicon carbide and techniques for reducing micropipes in silicon carbide semiconductor material.

BACKGROUND OF THE INVENTION

As one can ascertain, silicon carbide (SiC) is an excellent material for high temperature applications. For example, the use of silicon carbide in a pressure transducer application is shown in U.S. Pat. No. 6,058,782 entitled, "Hermetically Sealed Ultra High Temperature Silicon Carbide Pressure Transducers and Methods for Fabricating the Same", which issued on May 9, 2000 to A. D. Kurtz et al. and is assigned to the assignee herein, Kulite Semiconductor Products, Inc. It has also been established that SiC is an excellent piezoresistive material. This can be ascertained also by reference to the above-noted patent.

Also, see U.S. Pat. No. 6,034,001 entitled, "Method for Etching a Silicon Carbide Semiconductor Using Selective Etching of Different Conductivity Types" which issued on Mar. 7, 2000 to A. D. Kurtz et al. and is assigned to the assignee herein.

Thus, in view of the above art, silicon carbide can be, and is presently being used for forming mechanical diaphragms and piezoresistive sensing elements. The piezoresistive sensing elements can be grown directly on a bulk SiC substrate forming a p-n junction type device. These devices are known in the prior art and are shown, for example, herein in FIGS. 1A and 1B.

Other piezoresistive elements can be bonded to a dielectrically isolated bulk silicon carbide material using any one of conventional bonding and etch back techniques. Such devices and techniques are shown in FIG. 2, for example see FIGS. 2A, 2B and 2C. These techniques produce a dielectrically isolated type of device. For a dielectrically isolated device, one normally uses 6H—SiC, 4H—SiC, 3C—SiC or any other type of SiC available to form piezoresistors and then uses a separate 6H—SiC or 4H—SiC for micromachining diaphragms. The micromachining of diaphragms is also well known and reference can be made to the above-noted patents, for example.

See also a co-pending application entitled, "High Temperature Sensors Utilizing Doping Controlled, Dielectrically Isolated Beta Silicon Carbide (SiC) Sensing Elements on a Specifically Selected High Temperature Force Collectin Membrane", filed on Nov. 2, 2001, having Ser. No. 10/008,313, wich specification is incorporated herein by reference.

In any event, all of the 6H—SiC and the 4H—SiC material produced contains a certain amount of micropipes. A micropipe is a very small hole about 0.5 to 10 microns which actually projects through the wafer. These micropipes are dispersed per unit area. Three techniques for producing SiC are: 1) Lely growth, 2) Seeded sublimation growth, and 3) CVD or chemical vapor deposition. All of these techniques result in a certain amount of micropipes in the produced bulk SiC material. The high temperature CVD (HTCVD) process is used for growing bulk SiC material of improved quality, but does not eliminate micropipes.

The presence of micropipes in the semiconductor material presents a number of problems. The first problem is electrical in nature, where the electrical performance of the semiconductor suffers as a result of the micropipes. This problem is especially troublesome in the making of minority carrier devices, but does not present a serious problem in the making of majority carrier devices, such as piezoresistive pressure sensors.

The second problem is mechanical in nature, where the presence of micropipes in the sensing membrane enables air and other gases to penetrate through the bulk material. This is a serious problem in the fabrication of pressure sensors where the sensing diaphragm micromachined in SiC cannot allow any gases to penetrate through at all. The presence of micropipes also introduces stress raisers in the material, thus leading to the premature fracture of formed diaphragms.

In order to enable the use of bulk SiC as a diaphragm material for different pressure measurement, the problem of micropipes must be solved. One technique previously developed and presently used is to drastically oxidize the SiC to a point at which the micropipes effectively close. The ability to close micropipes using oxidation is attributed to the fact the during the oxidation process about half of the oxide is formed within the silicon carbide while the other half grows on top of the silicon carbide material. The part that grows on top of the SiC effectively shrinks the diameter of the micropipe to the point at which gases cannot get through.

The oxidizing technique, although enabling one to close the micropipes, does have a number of limitations. First, it is very difficult to oxidize SiC, since it takes a very long time to close even the smallest of the micropipes. Second, the bigger micropipes may never be closed by oxidation, thus leaving a fraction of the expensive SiC wafer unusable.

SUMMARY OF INVENTION

In the present invention, one sputters or otherwise deposits or grows a layer of silicon on the backside of the micromachined diaphragm. This is followed by an oxidation process. In this approach, the deposition of silicon, in itself, reduces or completely plugs the micropipes. After the silicon deposition, the wafer is oxidized, which completely closes the otherwise reduced micropipes. Since the oxidation process is significantly faster in silicon than in SiC, it is significantly easier to close even the largest of the micropipes. The thickness of the silicon, the process of depositing or growing silicon, and the process of oxidation can be adjusted to close micropipes in different SiC materials.

The unanticipated advantage of the present invention is that one can sputter, or otherwise deposit silicon on both sides of the micromachined SiC material and then perform the oxidation process. Once the SiC substrate is oxidized, and the silicon converted into oxide, the front side oxide is used as an insulating layer suitable for the dielectrically isolated process stated above. The silicon, which is converted into oxide on the backside will close the micropipes. Then a preprocessed piezoresistive pattern formed from 3C on silicon, 6H, 4H or other type of silicon carbide can be used to bond to the front side oxide layer. Once the bond takes place, the backside of the pattern wafer can be thinned down, using either lapping and polishing or etching techniques, until only the thin piezoresistive 3C, 6H or 4H pattern layer remains on bonded to the oxide below. This results in a dielectrically isolated piezoresistor pattern on SiC diaphragms, as well as having a completely sealed back surface. This provides an improved high temperature device.

BRIEF DESCRIPTION OF THE FIGURES

FIG. 1 consists of FIGS. 1A and FIG. 1B, which depicts a prior art SiC piezoresistive device including a p-n junction.

FIG. 2 consists of FIGS. 2A, 2B and 2C and shows a dielectrically isolated SiC transducer which utilizes conventional bonding techniques and which employs a SiC pattern wafer bonded to a SiC substrate via an oxide layer.

DETAILED DESCRIPTION OF THE FIGURES

Figure 3:
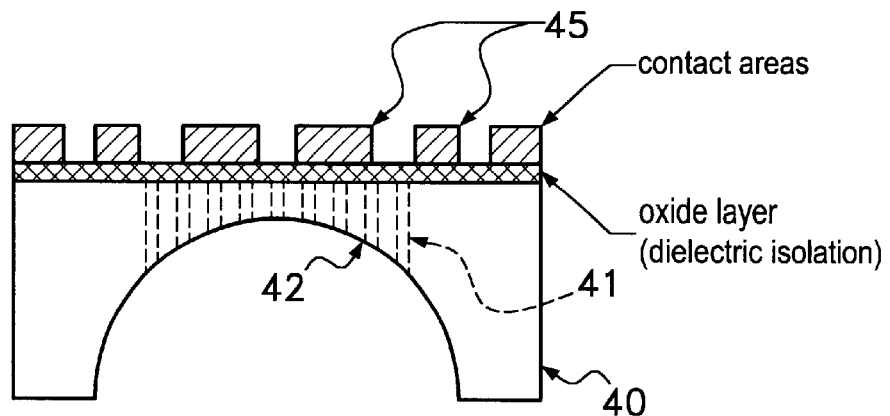
FIG. 3 depicts a prior art silicon carbide dielectrically isolated transducer-employing piezoresistors.

Referring to FIG. 1, there is shown a substrate 10 of bulk p-type material. Substrate 10, for example, is 6H—SiC bulk p-type material. Formed on the surface of substrate or bulk material 10 is an epi-layer of n-type SiC 11. The epi-layer of n-type silicon carbide 11 can be grown by various techniques, such as vapor deposition or other techniques to coat the top surface of the bulk material 10.

Shown in FIG. 1B is the processing of piezoresistor elements, which are processed directly from the n-type epi-layer 11. Each piezoresistor element, such as 12, is a serpentine resistor which changes resistance according to applied pressure as is well known. Also shown on FIG. 1B are contact areas 14 which are further processed on the wafer. During processing, an area of the bulk material is etched out to form a top surface diaphragm where the piezoresistors 12 are designated in the thinner area of the member which deflects upon application over force. This technique is extremely well known. A bottom aperture 10 is formed to define the membrane position of the sensor referred also as a diaphragm.

Referring to FIG. 2, there is shown a piezoresistive sensor which is bonded to a dielectrically isolated SiC material using a conventional bonding technique. In FIG. 12A there is shown again, a bulk substrate 30 which consists of SiC, which substrate may be 6H—SiC or 4H—SiC. Grown on the substrate 30 is an oxide layer 31 of a conventional oxide ($SiO_2$) which is deposited or otherwise formed directly on the surface of the SiC substrate. A pattern wafer consisting of patterned 4H or 6H SiC layer on bulk SiC or consisting of extremely thin section of n-type 3C silicon carbide on silicon also is fabricated and is now molecularly bonded to the oxide layer 31. Thus, wafer 32 is secured to the oxide layer 31 by a molecular bond after which the substrate on which 3C, 6H or 4H piezoresistor pattern layer was formed is removed using either a lapping and polishing technique, a chemical etching technique or a combination of both. Only a thin 3C, 6H or 4H pattern layer will be left on the oxide layer as shown in FIG. 2B. Note, for 3C SiC the sacrificial substrate will be silicon and for the 6H and 4H SiC patterns it will be bulk SiC.

In FIG. 2C, the n-type silicon carbide wafer 32 is treated to form piezoresistors 35, contact areas 36 and an active or diaphragm area 37. The active area, which is an etched out region 37, is formed in the bulk substrate 30. Above the active area on the top surface are located the piezoresistors 35, which as indicated, change length according to an applied pressure. The change of length indicates a change in resistance. When the piezoresistors 35 are configured in a suitable bridge circuit which provides a change in voltage where the change in voltage is a function of applied pressure. Since the devices use SiC, it can operate at extremely high temperatures as compared to other type of devices.

Referring to FIG. 3, there is shown a micromachined device as, for example, shown in FIG. 2C where the bulk SiC substrate 40 contains micropipes designated by numeral 41. As indicated previously, the micropipes cause two problems. The first problem is that the micropipes can cause mechanical problems where the micropipes, as shown, access the sensing membrane portion of the transducer. The membrane portion of the transducer is designated by reference numeral 42 and has the micropipes directed therein. In this manner, gas and air can penetrate through the bulk material. The penetration of the gas into the bulk material causes problems in effecting the bulk material. The presence of the micropipes 41, as indicated, also introduces stress raisers in the material, thus possibly leading to the premature fracture of formed diaphragms. While FIG. 3 relates to a piezoresistive sensor device, there is also a problem in the fabrication of minority carrier devices because the electrical performance of a minority carrier device suffers as a result of the micropipes. For example, the area 45 depicted as a piezoresistor, for example, as shown in FIG. 3 may also be a field effect device or other device whereby the micropipes would effect the performance of such minority carrier devices.

Figure 4:
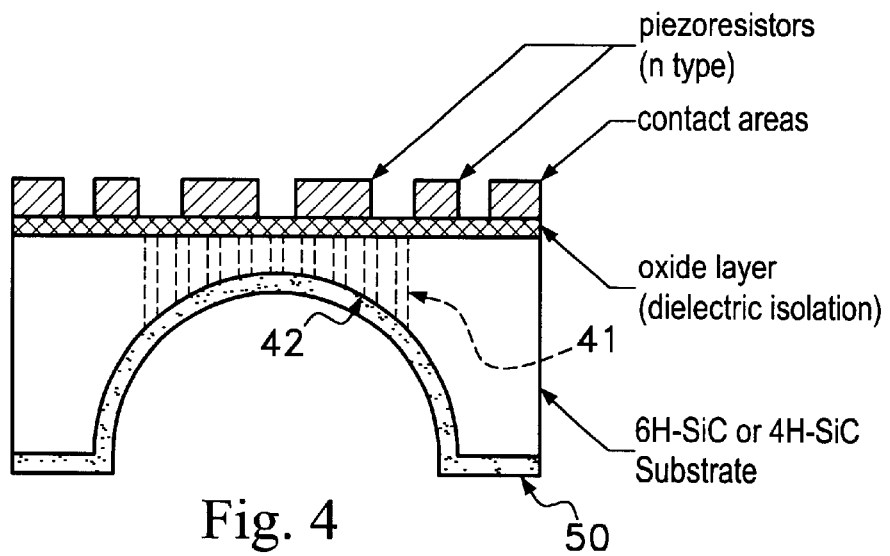
FIG. 4 shows a first step in forming a SiC transducer according to the invention employing a layer of polysilicon grown over the active surface of the transducer.

Referring to FIG. 4, it is seen that in the present invention, one sputters or deposits or grows a layer of silicon on the backside of the micromachined SiC diaphragm structure. The layer of silicon is grown by well known techniques, which basically would form a polysilicon layer 50 about the active area and about the bottom of the diaphragm membrane 42. Then the layer of silicon 50 is then oxidized. In this occurrence, the deposition of silicon in itself reduces or completely plugs the micropipes 41. After the silicon deposition, the wafer is oxidized which completely closes the otherwise reduced micropipes 41. Since the oxidation process is significantly faster in silicon than in SiC, it is significantly easier to close even the largest of the micropipes. The thickness of the silicon, the process for depositing or growing silicon and the process of oxidation can be adjusted to close the micropipes for different SiC materials.

Figure 5:
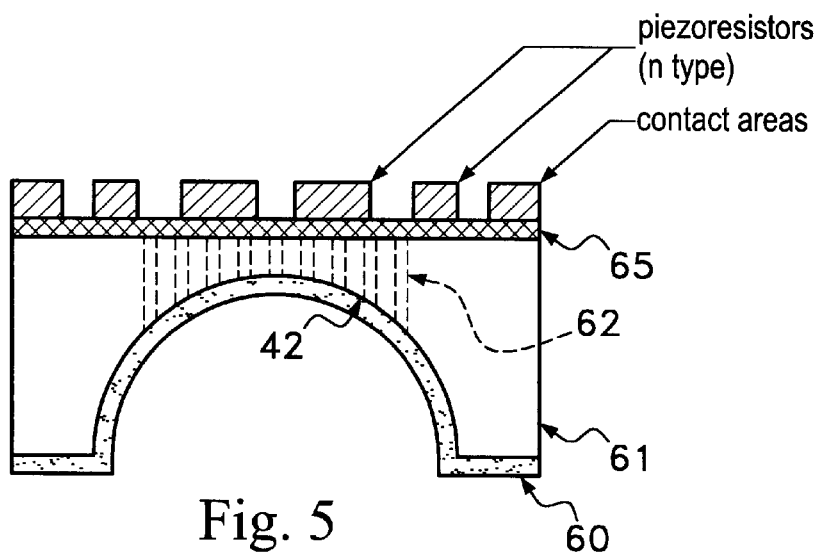
FIG. 5 shows the oxidation of the polysilicon layer to form $SiO_2$ as fabricated according to this invention.

Referring to FIG. 5, there is shown a completed structure according to this invention where layer 60 refers to a layer of silicon dioxide which coats the active region of the SiC substrate 61 having the micropipe 62 located therein. Thus, in the micromachined structure shown in FIG. 5, the entire bottom surface of the SiC wafer is coated with silicon dioxide.

The unanticipated advantage of the present invention is that one can sputter, or otherwise deposit silicon on both sides of the micromachined SiC material, and then perform the oxidation process. The silicon can be converted into an oxide also on the front side and this layer can be used as an insulating layer as, for example, layer 65 of FIG. 5.

The silicon, which is converted into an oxide on the back side will close the micropipes. This is a preprocessed piezoresistive pattern formed from either 3C SiC on silicon or 6H or 4H on bulk SiC or other type of SiC can be used to bond to the front side oxide layer, followed by the removal of the silicon bulk SiC substrate material, thus resulting in dielectrically isolated piezoresistors on silicon carbide diaphragms, as well as in a completely sealed back surface.

While the above-noted invention has been described, it should be obvious to one skilled in the art that there may be alternative processes to be utilized which would all deem to be in compass with the spirit and scope of the invention as depicted herein.

We claim:

1. A method of closing micropipes in a micromachined silicon carbide (SiC) diaphragm, comprising the steps of:
   forming a layer of silicon on a machined surface of said SiC diaphragm,
   oxidizing the formed layer to fully close the micropipes.

2. The method according to claim 1 wherein the step of forming said layer is sputtering silicon on said surface.

3. The method according to claim 1 wherein the steps of forming said layer is growing a layer of silicon on said surface.

4. The method according to claim 1 wherein the steps of forming said layer is depositing a layer of silicon on said surface.

5. The method according to claim 1 further comprising the steps of forming a layer of silicon on all sides of said micromachined silicon carbide (SiC) diaphragm,
   oxidizing the formed layers using the oxide found on at least one surface for electrostatically bonding a SiC pattern wafer to said micromachined wafer processed said pattern wafer to provide a semiconductor device.

6. The method according to claim 5 wherein said semiconductor device is a piezoresistive transducer.

7. The method according to claim 5 wherein said semiconductor device is a minority carrier device.

8. The method according to claim 5 wherein said SiC pattern wafer is selected from 3C, 6H, 4H or other type of silicon carbide.

9. The method according to claim 1 wherein said layer of silicon is polysilicon.

10. The method according to claim 1 wherein said micromachined SiC diaphragm is fabricated from 6H—SiC material.

11. The method according to claim 10 wherein said 6H—SiC material is p-type.

12. The method according to claim 11 wherein said SiC pattern wafer is n-type.

* * * * *